United States Patent [19]

Moertel

[11] 4,187,791
[45] Feb. 12, 1980

[54] METHOD OF MANUFACTURING SLIDE FASTENER STRINGERS

[75] Inventor: George B. Moertel, Conneautville, Pa.

[73] Assignee: Textron Inc., Providence, R.I.

[21] Appl. No.: 878,094

[22] Filed: Feb. 15, 1978

Related U.S. Application Data

[60] Division of Ser. No. 648,428, Jan. 12, 1976, Pat. No. 4,100,656, which is a continuation-in-part of Ser. No. 539,642, Jan. 9, 1975, Pat. No. 3,975,802.

[51] Int. Cl.² .......................... D05B 3/18; A44B 19/40
[52] U.S. Cl. ................................. 112/265.2; 156/201; 156/256; 156/257; 29/410
[58] Field of Search ...................... 112/265.2, 104, 105; 29/410; 24/205.16 C, 205.1 C, 205.13 C; 156/91, 201, 203, 252, 257, 293

[56] References Cited

U.S. PATENT DOCUMENTS

| 3,444,598 | 5/1969 | Glindmeyer et al. | 112/265 X |
| 3,490,110 | 1/1970 | Frohlich | 112/265 X |
| 3,561,073 | 2/1971 | Rosser | 112/265 X |
| 3,579,748 | 5/1971 | Chery | 112/265 X |
| 3,665,879 | 5/1972 | Sohr | 112/265 |
| 3,755,879 | 9/1973 | Cuckson | 112/265 X |
| 4,075,740 | 2/1978 | Svensson | 24/205.13 C |

Primary Examiner—Werner H. Schroeder
Assistant Examiner—Andrew M. Falik
Attorney, Agent, or Firm—O'Brien & Marks

[57] ABSTRACT

A method of manufacturing a slide fastener stringer is disclosed as including the steps of cutting a row of transverse slits in a strip, and applying a row of reinforcements across the strip, placing a continuous coupling element on the strip so that head portions protrude out of the slits.

26 Claims, 60 Drawing Figures

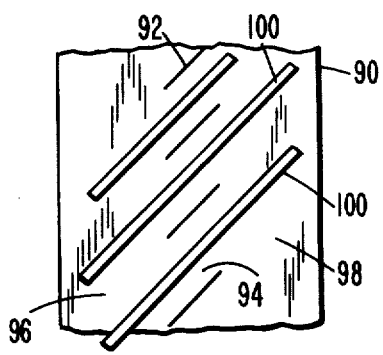
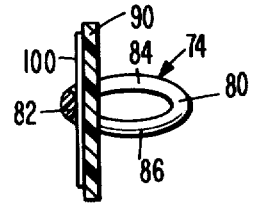
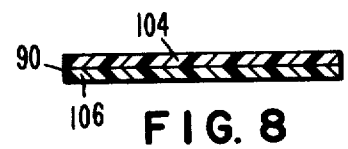
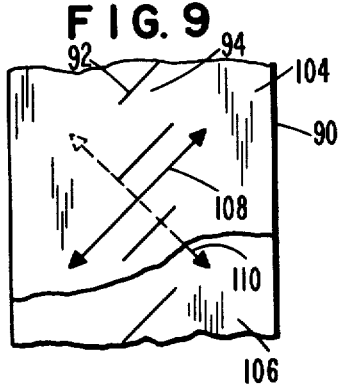
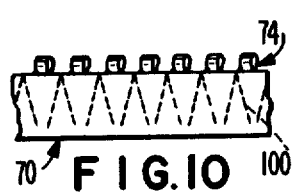
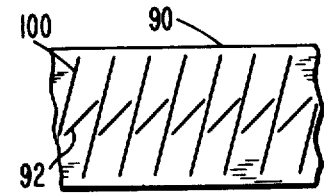
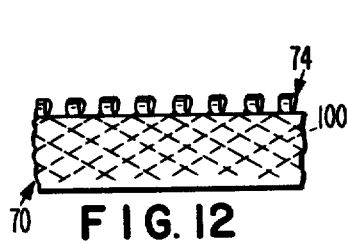
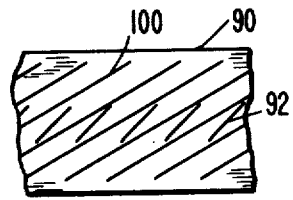
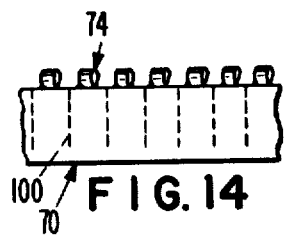
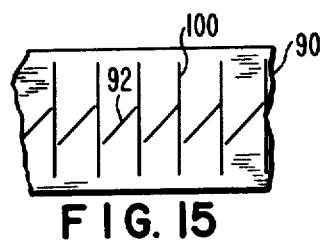
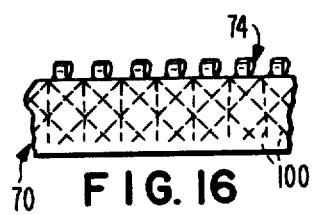
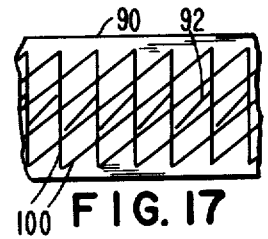

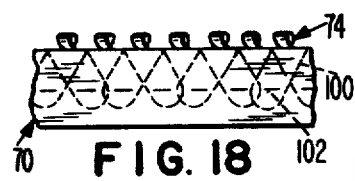
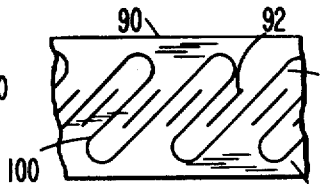
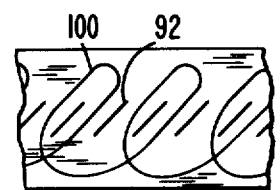
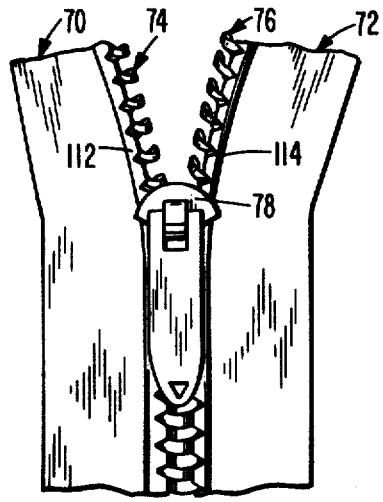
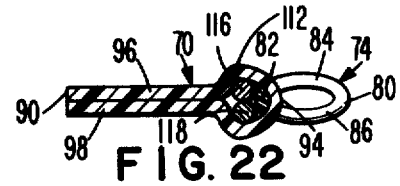
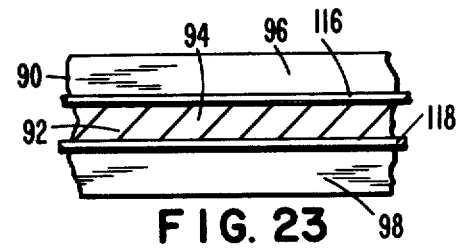
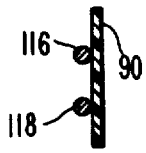
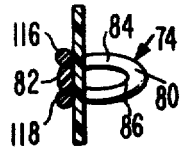
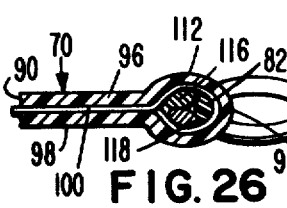
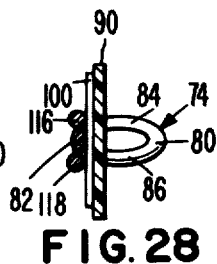
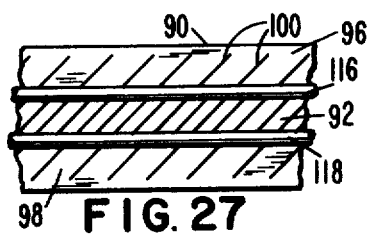
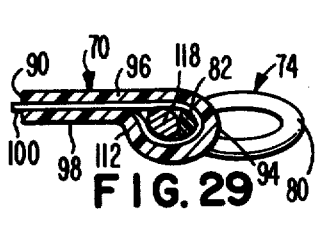
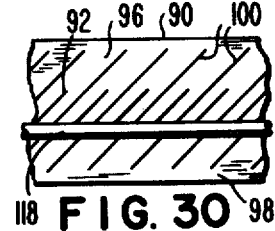
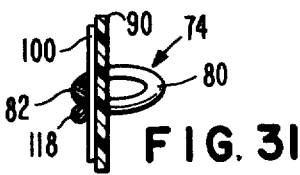
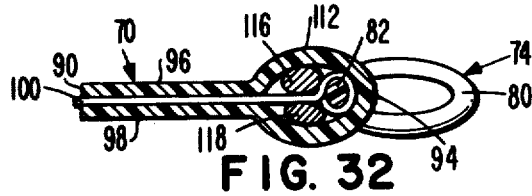

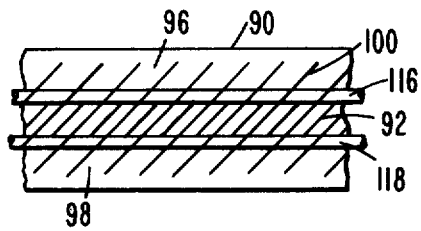
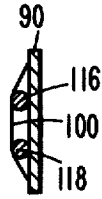
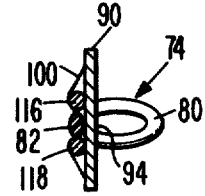
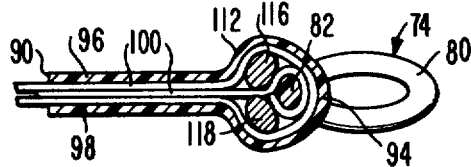
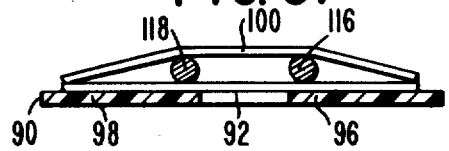
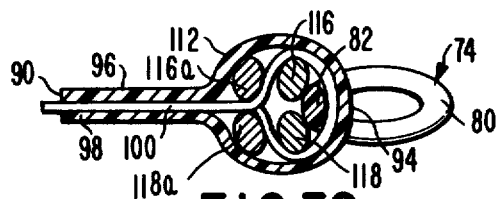
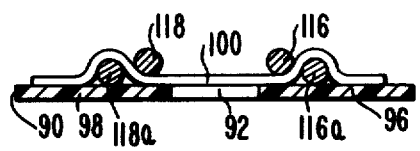
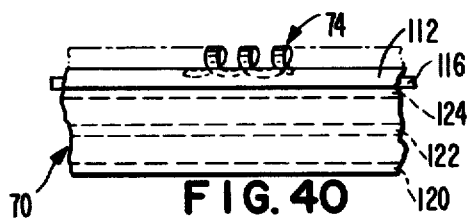
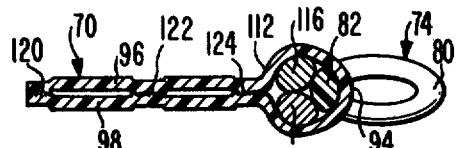
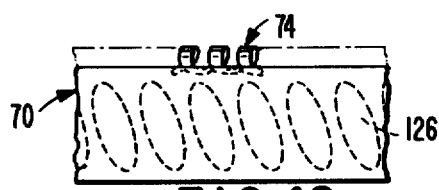
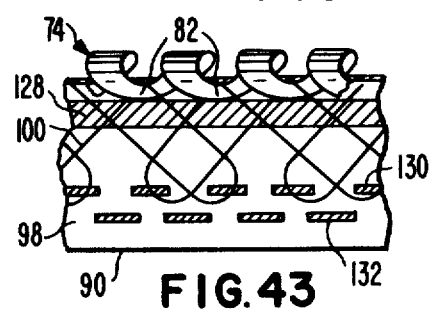
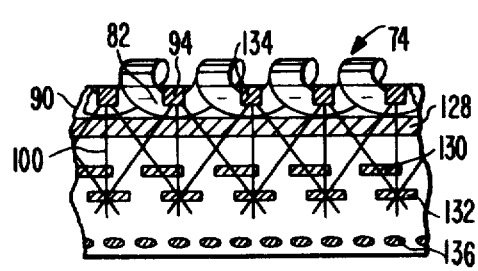

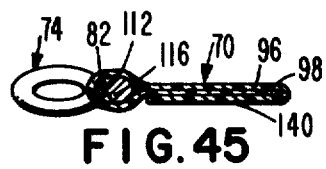
FIG. 45
FIG. 46
FIG. 47
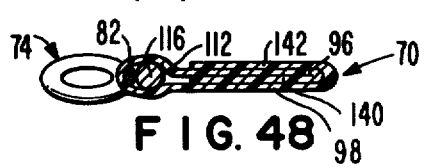
FIG. 48
FIG. 49
FIG. 50
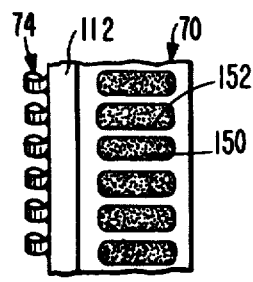
FIG. 51
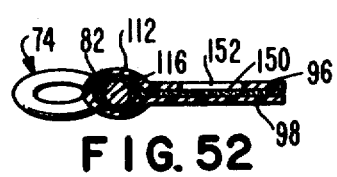
FIG. 52
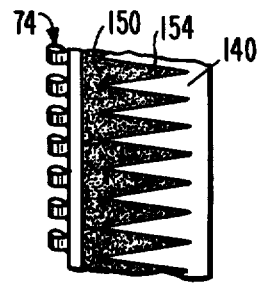
FIG. 53
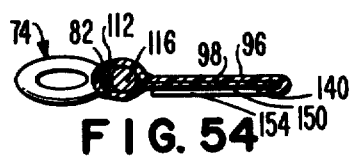
FIG. 54
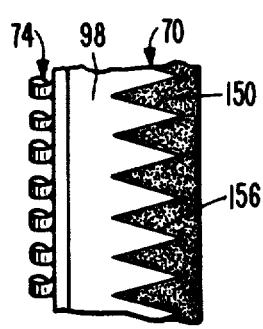
FIG. 55
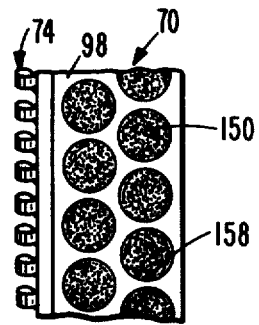
FIG. 56

METHOD OF MANUFACTURING SLIDE FASTENER STRINGERS

CROSS REFERENCE TO RELATED APPLICATIONS

This is a divisional application of pending application Ser. No. 648,428 filed Jan. 12, 1976 (which is incorporated herein by reference) and which issued July 18, 1978 as U.S. Pat. No. 4,100,656 as a continuation-in-part application of parent application Ser. No. 539,642 filed Jan. 9, 1975 which issued as U.S. Pat. No. 3,975,802 on Aug. 24, 1976 and which is also incorporated herein by reference.

BACKGROUND OF THE INVENTION

1. Field of the Invention

This invention relates to slide fasteners wherein continuous coupling elements are secured within a folded carrier tape with interlocking head elements protruding from openings in the folded edge.

2. Description of the Prior Art

The prior art, as exemplified in U.S. Pat. Nos. 1,557,303, 1,609,487, 1,933,390, 1,937,297, 2,018,099, 3,430,304, 3,517,422 and 3,854,174, British Pat. No. 1,161,016, and French Pat. Nos. 452,527 and 1,135,269, contains a number of fasteners including slide fasteners having head portions of coupling elements protruding from openings formed in the folded edge of a carrier tape. Despite the obvious cost advantage of low cost strips such as synthetic polymer or paper strips over woven textile tapes, the employment of low cost slide fasteners having low cost tapes has not been significant; this failure can be attributed to deficiencies in the prior art, such as inferior support for the coupling elements, unsightliness of the tapes, difficulty in attachment of the tapes to an article, etc.

SUMMARY OF THE INVENTION

The invention is summarized in that a stringer for a slide fastener includes a carrier tape formed from a strip longitudinally folded at one edge; the carrier tape having a plurality of spaced slits formed in the strip transversely over the one edge defining looped strap portions extending over the one edge between the slits; a continuous coupling element having a plurality of successive sections each including a head portion extending from a respective slit of the plurality of slits, and including an interconnecting portion extending through a respective one of the looped strip portions and joined with an adjoining section; and a plurality of reinforcing sections of fiber secured to the strip and extending transverse the one edge of the strip over the respective interconnecting portions.

An object of the invention is to manufacture a lower cost slide fastener with improved tape strength, reliability and ease of installation.

Another object of the invention is to reinforce a low cost strip used to form tapes in slide fasteners.

It is also an object of the invention to distribute stress from the coupling elements of a slide fastener to a wide area of the supporting tape.

A further object of the invention is to manufacture a slide fastener stringer having a low cost polymer tape with selected bonding means and which is not distorted nor unsightly.

One advantage of the invention is that it makes possible the manufacture of low cost slide fasteners suitable for use in applications where present slide fasteners are too expensive, and suitable for replacing more expensive slide fasteners used in products which do not require the superiority of woven tape slide fasteners.

Additional features of the invention include the optimization of mechanical properties of a supporting tape by selecting slit direction and orientation or by selecting molecular orientation of the tape to match the coupling element supported by the tape.

Other objects, advantages and features of the invention will be apparent from the following description of the preferred embodiments taken in conjunction with the accompanying drawings.

BRIEF DESCRIPTION OF THE DRAWINGS

FIG. 6 is a view similar to FIG. 5 illustrating a second step in the manufacture.

FIG. 7 is a cross-section view of assembled parts in a later step than shown in FIG. 6.

FIG. 8 is a cross-section view of a second variation of the strip.

FIG. 9 is a plan view of the strip variation shown in FIG. 8.

FIG. 10 is a plan view of a second variation of the stringer for the slide fastener.

FIG. 11 is a plan view of assembled parts in an intermediate step of manufacture of the variation of FIG. 10.

FIG. 12 is a plan view of a third variation of the stringer for the slide fastener.

FIG. 13 is a plan view of assembled parts in an intermediate step of the manufacture of the variation of FIG. 12.

FIG. 14 is a plan view of a fourth variation of the slide fastener stringer.

FIG. 15 is a view similar to FIGS. 11 and 13 of the variation of FIG. 14.

FIG. 16 is a plan view of a fifth variation of the slide fastener stringer.

FIG. 17 is a plan view of several assembled parts after an intermediate step in the manufacture of the stringer of FIG. 16.

FIG. 18 is a plan view of a sixth variation of the slide fastener stringer.

FIG. 19 is a plan view of assembled parts in an intermediate step of the manufacture of the variation of FIG. 18.

FIG. 20 is a plan view similar to FIG. 19 illustrating a seventh variation of the slide fastener stringer.

FIG. 21 is a plan view of a modified slide fastener in accordance with the invention.

FIG. 22 is a cross-section view of a stringer of the fastener of FIG. 21.

FIG. 23 is a plan view of assembled parts at an intermediate step in the manufacture of the stringer of FIG. 22.

FIG. 24 is a cross-section view of the assembled parts of FIG. 23.

FIG. 25 is a cross-section view similar to FIG. 24 but at a later step in the manufacture of the stringer.

FIG. 26 is a cross-section view of a second variation of the modified stringer of FIG. 22.

FIG. 27 is a plan view of assembled parts at an intermediate step in the manufacture of the variation of FIG. 26.

FIG. 28 is a cross-section view of the assembled parts of the variation of FIG. 26 at a manufacturing step later than that shown in FIG. 27.

FIG. 29 is a cross-section view of a third variation of the stringer of FIG. 22.

FIG. 30 is a plan view of assembled parts at an intermediate step in the manufacture of the stringer variation of FIG. 29.

FIG. 31 is a cross-section view of assembled parts of the variation of FIG. 29 but at a subsequent manufacturing step after that shown in FIG. 30.

FIG. 32 is a cross-section of a fourth variation of the stringer of FIG. 22.

FIG. 33 is a plan view of assembled parts at an intermediate step in the manufacture of the variation of FIG. 32.

FIG. 34 is a cross-section view of the assembled parts of FIG. 33.

FIG. 35 is a cross-section view similar to FIG. 34 but during a later step in the manufacture.

FIG. 36 is a cross-section view of a fifth variation of the stringer of FIG. 22.

FIG. 37 is a cross-section view of assembled parts in an intermediate step of the manufacture of the variation of FIG. 36.

FIG. 38 is a cross-section view of a sixth variation of the stringer of FIG. 22.

FIG. 39 is a cross-section view of assembled parts in an intermediate step of the manufacture of the variation of FIG. 38.

FIG. 40 is a plan view of another modified slide fastener stringer.

FIG. 41 is a cross-section view of the stringer of FIG. 40.

FIG. 42 is a plan view of a second variation of the stringer of FIGS. 40 and 41.

FIG. 43 is a planar cross-section view of a third variation of the modified stringer of FIGS. 40 and 41.

FIG. 44 is a view similar to FIG. 43 of a fourth variation of the modified stringer of FIGS. 40 and 41.

FIG. 45 is a cross-section view of still another modified stringer for a slide fastener.

FIG. 46 is a cross-section view of a second variation of the stringer of FIG. 45.

FIG. 47 is a cross-section view of a third variation of the modified stringer of FIG. 45.

FIG. 48 is a cross-section view of a fourth variation of the modification of FIG. 45.

FIG. 49 is a cross-section view of a further modification of the slide fastener stringer.

FIG. 50 is a cross-section view of a variation of the modification of FIG. 49.

FIG. 51 is a plan view of a still further modified slide fastener stringer.

FIG. 52 is a cross-section view of the modified stringer of FIG. 51.

FIG. 53 is a bottom view of a second variation of the modification of FIG. 51.

FIG. 54 is a cross-section view of the variation of FIG. 53.

FIG. 55 is a bottom view of a third variation of the modification of FIG. 51.

FIG. 56 is a bottom view of a fourth variation of the modification of FIG. 51.

DESCRIPTION OF THE PREFERRED EMBODIMENTS

Figure 1:
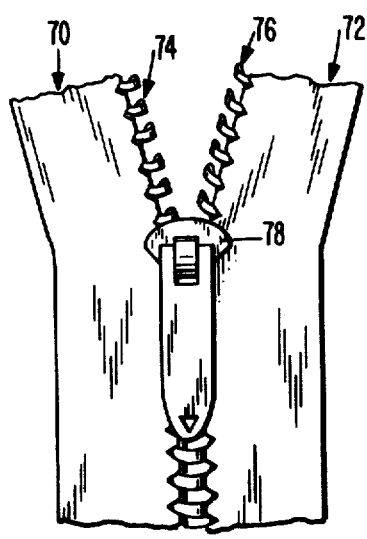
FIG. 1 is a plan view of a slide fastener manufactured in accordance with the invention.

As illustrated in FIG. 1 a slide fastener manufactured in accordance with the invention includes a pair of planarly disposed tape members indicated generally at 70 and 72, a pair of interlocking coupling elements indicated generally at 74 and 76, and a conventional slider 78 which is slidable along the coupling elements 74 and 76 for opening and closing the interlocking coupling elements. As viewed in FIG. 1, the tape member 70 and the coupling element 74 form a left stringer and the tape member 72 and the coupling element 76 form a right stringer. The right stringer is substantially a mirror image of the left stringer.

Figure 2:
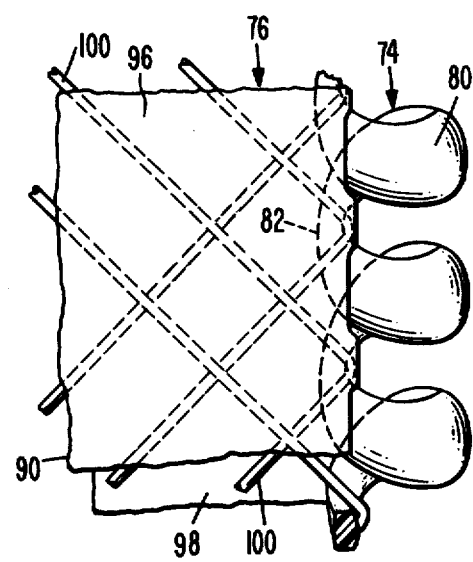
FIG. 2 is an enlarged view of a broken away portion of one stringer of the fastener of FIG. 1.
Figure 3:
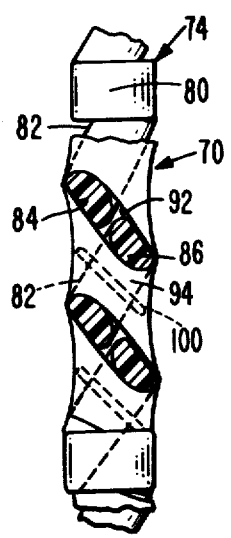
FIG. 3 is a side view with parts broken away of the stringer portion of FIG. 2.
Figure 4:
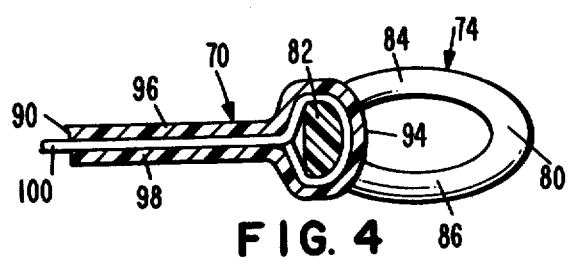
FIG. 4 is a cross-section view of the stringer portion in FIGS. 2 and 3.

As illustrated in FIGS. 2, 3 and 4 the coupling element 74 is a continuous coupling element, such as a spiral coil coupling element having successive sections each including a head portion 80 and an interconnecting portion 82 connected to an adjoining section. The illustrated spiral coupling element is formed into the successive sections or convolutions from a continuous filament, such as a nylon or a polyester monofilament, which has an oblate cross section, such as a D-shaped cross section. In the spiral coupling element 74 an upper leg portion 84 and a lower leg portion 86 extend from respective upper or lower sides of the head portion 80 and interconnect with the connecting or heel portions 82 to the respective adjoining sections of the coupling element 74.

Figure 5:
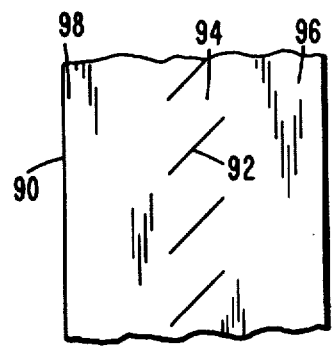
FIG. 5 is a plan view of a strip used in the manufacture of the slide fastener of FIG. 1.

The support tape 70 is formed from a strip 90, FIG. 5, which has a longitudinal row of transverse slits 92 formed in an intermediate section thereof the define strap portions 94 extending between opposite strip portions or halves 96 and 98. As illustrated in FIG. 7 the coupling element 74 is assembled on one side of the strip 90 such that the head portions 80 and the leg portions 84 and 86 protrude from the slits 92, FIG. 3, on the other side of the strip 90 and the interconnecting portions 82 extend across or under the strap portions 94 on the one side of the strip 90. Then the strip is folded longitudinally along the intermediate portion to bring the opposite strip portions 96 and 98 together, FIG. 4, whereby the strap portions 94 form loops over the interconnecting portions 82 of the coupling elements. The strip 90 is formed from a low cost material, such as paper, plastic or the like; in the illustrated embodiment a synthetic polymer film material is used, such as a high density polyethelene or a similar polymer with suitable flexibilty and strength.

The slits 92 are formed at an oblique angle to the folded edge of the tape 70 so that the leg portions 84 and 86 of each convolution extend into opposite halves of the respective slit 92 at points spaced longitudinally along the folded edge of the member 70. As shown in FIG. 3, the monofilament forming the spiral coupling element 74 is twisted such that the longest dimensions of the oblate cross sections in the leg portions 84 and 86 are substantially aligned with each other and with the slits 92 where the leg portions 84 and 86 exit from the slits 92. The strap portions 94 are substantially wider than the slits 92 and extend generally perpendicular to the interconnecting portions 82.

The relatively wide strap portions 94 result in support of the interconnecting portions 82 by substantially the full strength of the strip 90. The alignment of the long dimension of the oblate cross section of the filament with the slits 92 results in wide distribution of the forces on the strap portions 94 and reduces point forces at the slits 92 increasing the resistance against tearing of the strap portions 94.

As shown in FIGS. 2, 3, 4 and 6, a plurality of reinforcing fiber sections 100 are secured to the inside surface of the folded strip 90 and extend over the interconnecting portions 82 of the coupling element 74. The reinforcing sections of fiber 100 extend transverse the strip 90 and have opposite portions extending onto the respective strip portions 96 and 98 such that when the strip is folded together the opposite portions of the fiber sections are sandwiched between the opposite strip portions 96 and 98. The reinforcing fibers 100 are selected to strengthen the fastener while not stiffening or otherwise deteriorating performance. The fiber sections 100 are a material, such as yarn ends or the like, which is flexible but has a substantially greater tensile strength than the film or strip 90. The reinforcing fiber sections 100 are laid at an oblique angle to the longitudinal dimension of the strip 90, such as the 45° angle as shown in the variation of FIGS. 2 and 6, at a 15° angle as shown in the variation of FIGS. 10 and 11, at a 60° angle as shown in the variation of FIGS. 12 and 13; or the reinforcing fibers are laid about perpendicular to the longitudinal dimension of the strip 90 as shown in the variation of FIGS. 14 and 15. In the variation of FIGS. 16 and 17 some of the fibers are laid perpendicular to the strip while others of the fibers are laid at an oblique angle to the strip 90. The oblique angle of the fiber sections 100 of the variation of FIGS. 2, 12 and 16 is sufficient that the end portions of the fiber sections 100 on one strip half cross the opposite end portions of the sections on the other strip half.

In the variations of FIGS. 2, 10, 12, 14 and 16 the reinforcing fibers 100 are illustrated as being severed lengths of fiber; however, the sections 100 are illustrated in the variations of FIGS. 18-20 are sections of a continuous reinforcing fiber which is looped to extend back and forth across the strip 90. In the stringer of FIGS. 18 and 19 the continuous fiber is looped in a sinuous pattern while FIG. 20 shows the formation of closed loops by the continuous reinforcing fiber. The loops of reinforcing fiber 100 are formed to extend down over the opposite strip halves 96 and 98 such that stitches 102, FIG. 18, pass through the loops in attaching the stringer to an article.

Various means can be employed to secure the reinforcing fiber section 100 to the strip 90 including an adhesive on the strip or on the fiber sections, a thermoplastic bond, or the like. Conveniently, the same securing means is used to bond the opposite halves 96 and 98 of the strip 90 together when the opposite halves are folded together. If the opposite halves 96 and 98 of the strip 90 are bonded together by a thermoplastic heat sealing technique, the fiber sections 100 can be secured by the bond between the opposite halves 96 and 98.

The fiber sections 100 substantially increase the strength of the tape member 70 and the support given to the coupling element 74. At least a substantial portion of a lateral force on the coupling element 74 is applied to the reinforcing fiber sections 100; the perpendicularly extending fibers in FIG. 14 and 16 have the most strength against a lateral force. When the reinforcing fiber sections 100 are laid at an oblique angle, the tape member 70 is also reinforced in its longitudinal dimension and the crosswise force on each section of the coupling element 72 is spread over a greater longitudinal section of the tape member 70. For example, in the variation of FIG. 10, the crosswise force of each coupling element section is spread by the reinforcing fiber sections 100 over an area of the tape member 70 substantially greater than the strap portion 94; in the variation of FIG. 2, the force is spread over an area which is longitudinally much wider; and in FIG. 12 the forces are spread over an even larger longitudinal area. The reinforcing fiber sections 100 which cross as in the variations of FIGS. 2, 12 and 16, provide interlinking of the support from adjacent fibers causing the folded edge of the strip to have a very stable longitudinal dimension; thus the head-to-head displacement of the coupling element 74 is maintained under substantially greater forces than in the absence of such crossing reinforcing fiber sections. Where both perpendicular extending fiber sections and oblique extending fiber sections are included as shown in FIG. 16, even greater transverse and longitudinal strength is imparted to the tape member 70.

The size and number of the reinforcing fiber sections per unit length of the tape member 70 can be varied. Only one reinforcing fiber section in a selected direction is illustrated per strap portion 94; however many more, less, or a random number per unit length of strip could be employed. Reinforcing fiber sections with various sizes, shapes and physical properties can be selected and laid in various geometric arrangements to tailor the fastener properties for specific applications.

It is noted that in the several modifications and their variations illustrated in the drawings, the same numerals are used to identify parts which are substantially similar in structure and/or function. For brevity, parts described in a previous modification or variation are not described in detail in the descriptions of the subsequent modifications or variations except to the extent necessary to understand such subsequent mmodifications or variations.

The properties of the tape member 70 can be varied by selecting a highly oriented thermoplastic material for the strip 90. In FIGS. 8 and 9 the strip 90 is formed by laminated layers 104 and 106 which have respective molecular orientations as illustrated by the respective arrows 108 and 110; such a laminated material with cross orientation is available under the trademark VALERON from Van Lear Plastics Inc. The molecular orientations 108 and 110 are transverse to the longitudinal dimension with the molecular orientation 108 being generally at the same oblique angle as the slits 92 so that the molecular orientation 108 is generally parallel the strap portions 94. The molecular orientation 110 is at an oblique angle opposite to the orientation 108 so as to cross the orientation 108. Alternately a single ply material having the orientation 108 can be used.

The plastic strip material has a substantially greater strength in the direction of molecular orientation so that it is thus seen that by making the orientation 108 parallel to the direction of the strap portions 94 of the strip 90, the strength of the strap portions 94 is substantially increased. Additionally the oblique angle of the orientation 108 results in the orientation of the opposite halves of longitudinal strip 90 crossing when the opposite halves are folded together; this crossing increasing the stability and strength of the tape members of the slide fasteners. Similarly, the crossing of the orientation 110 increases the strength and stability of the tape members.

In the modification of FIGS. 21-25, beads or raised ridges 112 and 114 are provided in the respective tape members 70 and 72 contiguous the coupling elements 64 and 66 for providing a slider flange bearing area. The bead 112 as illustrated in FIGS. 22-25 is formed by including longitudinal cord means such as a pair of cords 116 and 118 secured to the respective strip portions 96 and 98 on opposite sides of the intermediate section of the strip 90 including the slits 92. When the strip portions 96 and 98 are folded together the cords 116 and 118 are secured in engagement with each other and in abutting relationship to the external surfaces of the interconnecting portions 82 of the coupling element 74 between the strip portions 96 and 98. The cords 96 and 98 are made from a material which has the ability to cushion and distribute external forces on the bead 112 as well as from the interconnecting portions 82. The cords 116 and 118 are deformable in cross section so that they are compressed and conform to the interconnecting portions 82 and by the securing of the strip portions 96 and 98 together. The cords 116 and 118 preferably have a cross-sectional size sufficient to form a bead 112 raised from the plane of the tape member 70 by a distance about equal or slightly greater than the amount the coupling element 74 extends above the plane of the tape member 70. The cords 116 and 118 can be secured to the strip 90 before of after the assembly of the coupling element 74 by an adhesive either on the strip 90 or on the cords 116 and 118; or the cords 116 and 118 may be laid in and then secured by the securing of the opposite strip portions 96 and 98 together. Also the cords 116 and 118 have a selected tensile strength to impart a selected longitudinal reinforcement to the folded edge of the strip.

The cords 116 and 118 increase the durability of the stringer by absorbing and distributing forces from the slider operation. Support for the coupling element is also increased both (1) with respect to maintenance of longitudinal spacing of head elements 80 due to the tensile strength of the cords 116 and 118, and (2) with respect to the maintenance of the linearity and proper lateral extension of the head elements 80 due the compression of the cords 116 and 118 against the interconnecting portions 82.

In the variation illustrated in FIGS. 26, 27 and 28, a plurality of reinforcing fiber sections 100 are applied transverse the strip 90 to extend between the cords 116 and 118 and the strip 90 prior to the assembly of the coupling element 74 such that the reinforcing fiber sections 100 extend around the interconnecting portions 82 and the cords 116 and 118 when the tape 100 is folded and the strip halves or portions 96 and 98 are secured together. In addition to substantially reinforcing the strength of the tape member 70 against lateral forces, the reinforcing fiber sections 100 increase the securement of the cords 116 and 118 against the interconnecting portions 82.

In the variation shown in FIGS. 29, 30 and 31 only a single cord 118 is included, and the single cord is secured to the strip portion 98 with a substantially greater portion of the strip portion 98 surrounding the circumference of the cord 118 than the strip portion 96 such that the tape 80 is offset from the bead 112 and the coupling element 74. Thus as shown in FIG. 29, the upper side of the stringer can be made relatively smooth without any raised portion as in the variation of FIG. 26 wherein the coupling element 74 and the bead 112 extend above the tape 70.

As illustrated in FIGS. 32, 33, 34 and 35, the cords 116 and 118 can be first positioned on the opposite strip portions 96 and 98 and then the reinforcing fiber sections 100 laid over the cords 116 and 118 prior to assembly of the coupling element 74. Thus when the strip 90 is folded the fiber sections 100 extend between the cords 116 and 118 and around the interconnecting portions 82 of the coupling element 74. The cords 116 and 118 prevent any unevenness of the bead 112 due to the reinforcing fiber sections 100 interfering with slider flange movement, and further protect the fiber sections 100 from damage due to slider flange movement.

Some of the reinforcing fiber sections 100 are laid onto the strip 90 before the assembly of the cords 116 and 118 while others of the fiber sections 100 are laid over the cords 116 and 118 after the applications of the cords 116 and 118, but all the fiber sections 100 are laid prior to assembly of the coupling element 74 in the variation shown in FIGS. 36 and 37. Thus when the strip 90 is folded some of the reinforcing fiber sections 100 pass around the cords 116 and 118 and the interconnecting portions 82 of the coupling element 74 while others of the reinforcing fiber sections 100 extend between the cords 116 and 118 and around the interconnecting portions 82.

As illustrated in FIGS. 38 and 39, the sixth variation of the corded stringer includes four cords 116, 118, 116a and 118a to form the bead 112. The cords 116a and 118a are first laid onto the strip 90 and then the reinforcing fiber sections 100 are laid over the cords 116a and 118a with the cords 116 and 118 being subsequently applied. The coupling element 74 is assembled after the fiber sections 100 are laid. Thus when the tape 90 is folded, the reinforcing fiber sections 100 pass between the cords 116a and 118a but around the cords 116 and 118 and the interconnecting portions 82 of the coupling element 74. The reinforcing fiber sections 100 hold the cords 116 and 118 against the interconnecting portions 82, and the cords 116a and 118a protect the fiber sections 100 as well as preventing any unevenness of the slider-flange bearing bead 112.

In the modification illustrated in FIGS. 40 and 41, only selected areas of the overlying strip portions 96 and 98 are bonded together, such as bonds 120, 122 and 124 formed between longitudinal stripe areas of the strip portions 96 and 98. The bond 124 is contiguous the bead 112 so as to secure the cords 116 and 118 together in engagement or compression with the interconnecting portions 82 of the coupling element 74. The strip portions of the tape member 70 in the variation of FIG. 42 are bonded together only in longitudinally spaced areas 126 which are elongated transverse the tape member 70. In the variation of FIG. 43, a bond 128 is formed in a longitudinal stripe between the strip portions of the strip contiguous the interconnecting portions 82 and the opposite strip portions are also bonded together at short longitudinal sections 130 and 132 forming respective broken longitudinal lines. The strap portions 94 of the strip 90 in FIG. 44 are bonded at 134 to the interconnecting portions 82 of the coupling element. Also in FIG. 44 the strip halves are bonded together in small round areas 136 forming a row of dots. The reinforcing fiber sections 100 are secured in various portions of the bonded areas 128, 130 and 132 of FIGS. 43 and 44.

The bonds 120, 122, 124, 128, 130, 132, 134 and 136 are formed by a suitable bonding means such as a suitable adhesive, heat sealing, ultrasonic bonding, inductive sealing of selectively placed magnetic or dielectric susceptive material, etc.

Where an adhesive coating on the fiber sections 100 is employed, for example in the variation of FIGS. 1-7, the adhesive could be a thermosetting material, such as a cyanoacrylate adhesive, which is controlled in quantity and flowability to spread only to an area adjacent the fiber sections 100 where the strip halves 96 and 98 are forced together. A coating of an agent, such as 1,1,1-Trichloroethane, on the inside surface of the strip 90 can be used to speed the cure rate of the thermosetting material and to further control the degree of adhesive spread out from the fiber to the adjacent areas between the strip portions 96 and 98.

The bonding of only selected areas of the strip halves of the support tape member 70 together provides the optimum utilization of adhesive or areas of bond as well as providing for superior performance of the fastener. The partial bonding adequately secures the strip halves 96 and 98 together and minimizes distortion, stretching or weakening of the strip 90 due to the bonding. Further the bonding of the plastic strip portions together can be used to produce a pattern on the outside of the tape member 70 to make the slide fastener more pleasing and appealing in appearance. By selecting from various patterns of bonding the opposite strip portions, the performance of the fastener, i.e. the flexibility, the ease of operation, point loading, lateral loading, etc., can be tailored to meet a particular use of the fastener.

In the modification of FIG. 45, a portion 140 of the strip portion 96 is folded over the edge of the strip portion 98 opposite the coupling element 74 to extend back beneath the strip portion 98 to about the bead 112. In the variation of FIG. 46, portions 140 and 142 of the respective strip portions 96 and 98 are folded opposite the coupling element 74 inward against each other between the strip portions 96 and 98. A narrow folded portion 144 of the strip portions 98 is folded over the edge of the strip portion 96 and only extends a short distance toward the bead 112 in the variation of FIG. 46. FIG. 48 illustrates a double-wrap variation of the tape member 70 wherein the portion 140 is folded inside between the strip portions 96 and 98 and the portion 142 is folded over the strip portion 96 and folded portion 140.

The folded tape members 70 of FIGS. 45-48 provide for various smooth and finished edges as well as producing various thicknesses of the tape members which may be desirable in different uses of the fastener. Also the additional plys of the strip in the tape member 70 produced by the folding results in increasing the strength of the tape members 70.

A sewing guide is formed on the modification of FIG. 49 by forming a longitudinal pucker or ridge 146 in the upper strip portion 96. In FIG. 50 the upper strip portion 96 is made narrow while the lower strip portion is folded at an edge opposite the coupling element 74 to extend back on itself to just about to the edge of the upper strip portion 96; the space 148 between the edges of the strip portions 96 and 98 or the edges of the strip portions 96 and 98 forming a longitudinal sewing guide. The sewing guide can be used in sewing the tape member 70 to an article.

In the modification shown in FIGS. 51 and 52, an adhesive 150 (shown by the stippling) between the strip portions 96 and 98 is exposed through cutouts 152 in the strip portion 96. The adhesive 150 can be any material which can be used to adhere the tape member 70 to an article. Also the adhesive 150 secures the strip portions 96 and 98 together as well as securing the cord 116. The cutouts 152 are elongated transverse the longitudinal dimension of the tape member 70.

The adhesive 150 in the variation of FIGS. 53 and 54 between the strip portion 98 and the folded over portion 140 is exposed through triangular cutouts 154 forming a profiled edge on the portion 140. Reinforcing fiber sections between the strip portions 96 and 98 would not be exposed in this variation.

Various other shapes and arrangements of cutouts, such as triangular cutouts on a profiled edge of the strip portion 98 in the variation of FIG. 55 and a pair of longitudinal rows of circular cutouts 158 in the strip portion 98 of the variation of FIG. 56, can be used to expose various patterns of adhesive producing a selected attachment for an article.

Figure 57:
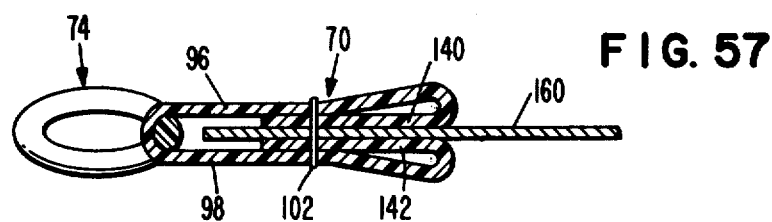
FIG. 57 is a cross-section view showing an application of the variation of FIG. 46.
Figure 58:
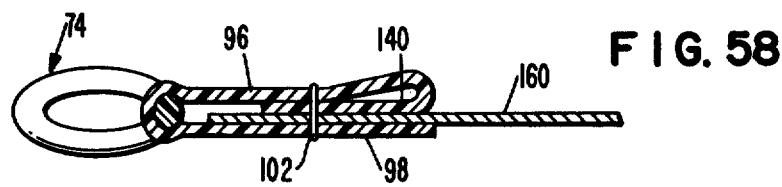
FIG. 58 is a cross-section view of a second variation of FIG. 57.
Figure 59:
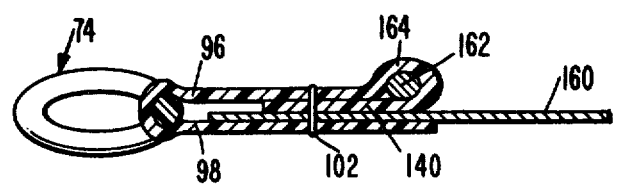
FIG. 59 is a cross-section view of a third variation of FIG. 57.

As illustrated in FIG. 57, the double folded tape member 70 of FIG. 46 can be fastened by means, such as stitches 102, on an edge of an opening in an article 160 with the folded portions 140 and 142 engaging opposite sides of the article 160; the exposed smooth rounded edges of the folds producing a pleated appearance. In FIG. 58, only the upper strip portion 96 is folded in; the lower strip portion 98 being left with an unfinished edge. A cord 162 is inserted in the fold in the upper strip portion 96 in the variation of FIG. 59 to produce a bead 164 adding to the appearance of the article with the fastener.

Figure 60:
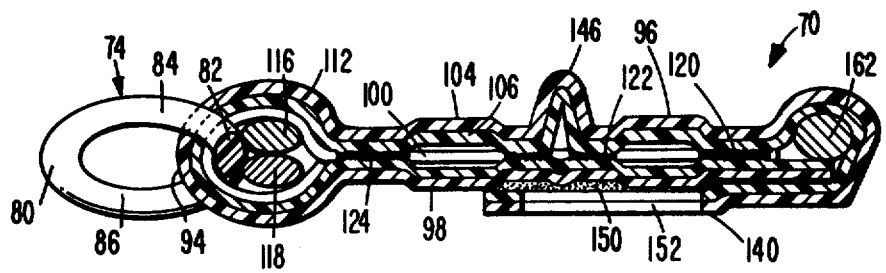
FIG. 60 is a cross-section view of a slide fastener stringer in which several modifications of previous Figs. have been combined.

Various features of the previously described modifications and variations can be combined in a selected manner, for example as shown in the modification of FIG. 60 which includes the reinforcing fiber sections 100 and oblique strap portions with aligned cross sections of oblate leg portions 84 and 86 of FIGS. 1-7, the oriented polymer layers 104 and 106 of FIGS. 8 and 9, the beaded edge 112 with cords 116 and 118 of FIGS. 21-28, the bonding means 120, 122 and 124 of FIGS. 40 and 41, the folded opposite edge portion 140 of FIG. 45, the sewing guide 146 of FIG. 49, and the cutouts 152 exposing the adhesive 150 of FIG. 51.

Since many modifications, variations and changes in detail may be made to the described embodiments, it is intended that all matter in the foregoing description and shown in the accompanying drawings be interpreted as illustrative and not in a limiting sense.

What is claimed is:

1. A method of forming a stringer for a slide fastener comprising
    cutting a row of spaced transverse slits in a strip along a longitudinal section intermediate the edges of the strip;
    applying a row of reinforcing sections of fiber on one side of the strip transversely across the intermediate longitudinal section of the strip;

assembling a continuous coupling element onto the one side of the strip such that head portions of the continuous coupling element protrude from the respective slits on the other side of the strip and such that interconnecting portions of the coupling element between successive head portions extend on the one side of the strip under strap portions of the strip defined between the slits; and folding the strip longitudinally along the intermediate section such that the strap portions and the reinforcing sections of fiber form loops around the interconnecting portions.

2. A method of forming a stringer for a slide fastener as claimed in claim 1 wherein said fiber sections are applied to extend substantially perpendicular to the longitudinal dimension of the strip.

3. A method of forming a stringer for a slide fastener as claimed in claim 1 wherein said fiber sections are applied to extend at an oblique angle to the longitudinal dimension of the strip.

4. A method of forming a stringer for a slide fastener as claimed in claim 1 wherein some of said fiber sections are applied to extend substantially perpendicular to the longitudinal dimension of the tape, and others of said fiber sections are applied to extend at an oblique angle to the longitudinal dimension of the strip.

5. A method of forming a stringer for a slide fastener as claimed in claim 1 including applying cord means to the inside surface of the strip prior to folding, and bonding the overlying strip portions of the tape together such that the cord is secured between the strip portions in engagement with the interconnecting portions of the coupling element.

6. A method of forming a stringer for a slide fastener as claimed in claim 1 including applying a pair of cords to the inside surface of the strip portions on opposite sides of the intermediate sections prior to folding, and bonding the overlying portions of the strip on opposite sides of the strap portions together such that the pair of cords are secured together and in engagement with the interconnecting portions of the coupling element.

7. A method of forming a stringer for a slide fastener as claimed in claim 6 wherein the cords are applied after the fiber sections are applied so that the fiber section loops extend around the cords after folding.

8. A method of forming a stringer for a slide fastener as claimed in claim 6 wherein said cords are applied before the fiber sections are applied so that the fiber sections extend between the cords when the strip is folded.

9. A method of forming a stringer for a slide fastener as claimed in claim 6 wherein some of the fiber sections are applied to the strip before the cords are applied so that the some fiber sections extend around the cords, and others of the fiber sections are applied to the strip after the cords are applied so that the other fiber sections extend between the cords when the strip is folded.

10. A method of forming a stringer for a slide fastener as claimed in claim 1 including forming a sewing guide line on the tape.

11. A method of forming a stringer for a slide fastener as claimed in claim 10 wherein the sewing guide is formed by folding one of the strip portions over the edge of the tape opposite the protruding head elements such that the edge of the one strip portion forms a sewing guide.

12. A method of forming a stringer for a slide fastener as claimed in claim 10 wherein the sewing guide is formed by forming a longitudinally puckered line in one of the overlying strip portions.

13. A method of forming a stringer for a slide fastener as claimed in claim 1 including folding back one of the strip portions opposite to the protruding head portions.

14. A method of forming a stringer for a slide fastener as claimed in claim 13 wherein the one strip portion is folded over the edge of the other strip portion.

15. A method of forming a stringer for a slide fastener as claimed in claim 13 including folding both of the strip portions opposite to the protruding head portions.

16. A method of forming a stringer for a slide fastener as claimed in claim 15 wherein one of the strip portions is folded over the folded edge of the other strip portion.

17. A method of forming a stringer for a slide fastener as claimed in claim 15 wherein both of the strip portions are folded inward so that they are against each other when the strip is folded.

18. A method of forming a stringer for a slide fastener as claimed in claim 13 including securing the opposite strip portions to opposite sides of an article.

19. A method of forming a stringer for a slide fastener comprising cutting a row of spaced transverse slits in a synthetic polymer strip along a longitudinal section intermediate opposite longitudinal edge portions of the strip;

assembling a continuous coupling element onto one side of the strip such that head portions of the continuous coupling element protrude from the respective slits on the other side of the strip, and such that interconnecting portions of the coupling element between successive head portions extend on the one side of the strip across strap portions of the strip between the slits;

folding the strip longitudinally along the intermediate section such that the strap portions form loops around the interconnecting portions, and opposite edge strip portions are brought together in overlying relationship; and bonding only portions of the overlying strip portions together to form a carrier tape for the stringer.

20. A method of forming a stringer for a slide fastener as claimed in claim 19 wherein only longitudinally spaced areas of the overlying strip portions are bonded together to form a pattern on the carrier tape.

21. A method of forming a stringer for a slide fastener as claimed in claim 19 including applying a row of sections of reinforcing fiber transversely across the intermediate longitudinal section of the strip on the one side of the strip prior to the assembly of the coupling element, said bonding including the bonding of opposite end portions of the sections of fiber between the overlying strip portions.

22. A method of forming a stringer for a slide fastener as claimed in claim 19 including applying longitudinal cord means to the inside of the strip prior to the bonding and after assembly of the coupling element, said folding and said bonding securing the cord between the opposite strip portions in engagement with the interconnecting portions.

23. A method of forming a stringer for a slide fastener comprising cutting a row of spaced transverse slits in a strip along a longitudinal section intermediate opposite longitudinal edge portions of the strip;

applying an adhesive to one of the opposite strip portions;

forming the strip portions such that when the strip portions are folded together a portion of the adhesive is left exposed suitable for attaching the stringer to an article;

assembling a continuous coupling element onto one side of the strip such that head portions of the continuous coupling element protrude from the respective slits on the other side of the strip, and such that interconnecting portions of the coupling element between successive head portions extend on the one side of the strip across strap portions of the strip between the slits; and folding the strip longitudinally across the intermediate section such that the strap portions form loops around the interconnecting portions, and such that adhesive bonds the opposite strip portions together forming a stringer.

24. A method of forming a stringer for a slide fastener as claimed in claim 23 including forming cutouts in the strip prior to folding such that the adhesive is exposed through the cutouts.

25. A method of forming a stringer for a slide fastener as claimed in claim 81 including applying a row of sections of reinforcing fiber transversely across the intermediate longitudinal section of the strip on the one side of the strip portion prior to the assembly of the coupling element, said adhesive securing the fiber sections to the strip.

26. A method of forming a stringer for a slide fastener as claimed in claim 24 including applying a cord to the inside of the strip after assembly of the coupling element, said adhesive securing the cord between the opposite strip portions in engagement with the interconnecting portions of the coupling element.

* * * * *